United States Patent
Li et al.

(10) Patent No.: US 12,524,964 B2
(45) Date of Patent: Jan. 13, 2026

(54) MODELING METHOD AND SYSTEM FOR TUBULAR STRUCTURE, AND COMPUTER-READABLE STORAGE MEDIUM THEREOF

(71) Applicant: Siemens Industry Software Inc., Plano, TX (US)

(72) Inventors: Guo Li, Shanghai (CN); Liao Huang, Shanghai (CN); Zhuyu Jin, Shanghai (CN); Feng Yu, Irvine, CA (US)

(73) Assignee: Siemens Industry Software Inc., Plano, TX (US)

( * ) Notice: Subject to any disclaimer, the term of this patent is extended or adjusted under 35 U.S.C. 154(b) by 191 days.

(21) Appl. No.: 18/558,511

(22) PCT Filed: May 8, 2021

(86) PCT No.: PCT/CN2021/092508
§ 371 (c)(1),
(2) Date: Nov. 1, 2023

(87) PCT Pub. No.: WO2022/236506
PCT Pub. Date: Nov. 17, 2022

(65) Prior Publication Data
US 2024/0242438 A1    Jul. 18, 2024

(51) Int. Cl.
*G06T 17/20* (2006.01)
*G06T 7/12* (2017.01)
*G06T 7/60* (2017.01)

(52) U.S. Cl.
CPC ............. *G06T 17/20* (2013.01); *G06T 7/12* (2017.01); *G06T 7/60* (2013.01); *G06T 2210/21* (2013.01)

(58) Field of Classification Search
CPC .. G06T 17/20; G06T 7/12; G06T 7/60; G06T 2210/21; G06F 30/17; G06F 2113/14; G06F 30/10
See application file for complete search history.

(56) References Cited

U.S. PATENT DOCUMENTS

2006/0159326 A1    7/2006 Rasche et al.
2006/0290695 A1*  12/2006 Salomie ................. G06T 17/20
                                                              345/423
(Continued)

FOREIGN PATENT DOCUMENTS

CN        108969097 A     12/2018

OTHER PUBLICATIONS

Lee, Sang Hun. "Offsetting operations on non-manifold boundary representation models with simple geometry." Proceedings of the fifth ACM symposium on Solid modeling and applications. 1999. pp. 42-53.

(Continued)

*Primary Examiner* — Sultana M Zalalee
(74) *Attorney, Agent, or Firm* — Lempia Summerfield Katz LLC

(57) ABSTRACT

A modeling method for a tubular structure includes: acquiring a structural wire-frame; generating, at each non-manifold node of non-manifold nodes of the structural wire-frame, a polyhedral structure formed by faces of a polyhedron; generating, at each manifold node of manifold nodes of the structural wire-frame, a connecting face; generating, at each end node of end nodes of the structural wire-frame, an end face; connecting vertices of the connecting wire-frame, vertices of the connecting face, and vertices of the end face; and carrying out curved-surface subdivision.

18 Claims, 15 Drawing Sheets

(56) References Cited

U.S. PATENT DOCUMENTS

| | | | |
|---|---|---|---|
| 2009/0278846 A1 | 11/2009 | Gulsun et al. | |
| 2013/0127847 A1* | 5/2013 | Jin | G06T 19/20 345/420 |
| 2013/0127857 A1 | 5/2013 | Carr et al. | |
| 2019/0147590 A1* | 5/2019 | Vikal | A61B 5/4244 382/131 |
| 2020/0273246 A1* | 8/2020 | Rockwood | G06T 17/20 |

OTHER PUBLICATIONS

Lee, Sang Hun. "Offsetting operations on non-manifold topological models." Computer-Aided Design 41.11 (2009), pp. 830-846.

Oh, Beom-Soo, and Chang-Hun Kim. "Progressive reconstruction of 3D objects from a single free-hand line drawing." Computers & Graphics 27.4 (2003), pp. 581-592.

International Search Report for PCT/CN2021/092508, dated Feb. 9, 2022, pp. 1-9.

\* cited by examiner

FIG. 4
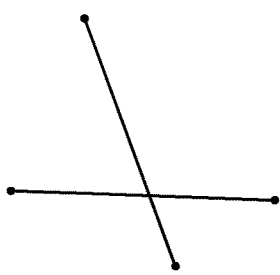
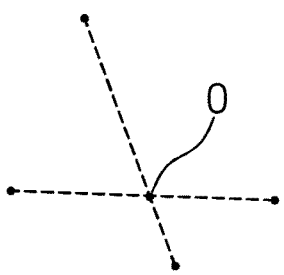

MODELING METHOD AND SYSTEM FOR TUBULAR STRUCTURE, AND COMPUTER-READABLE STORAGE MEDIUM THEREOF

The present patent document is a § 371 nationalization of PCT Application Serial No. PCT/CN2021/092508, filed May 8, 2021, designating the United States, which is incorporated by reference in its entirety.

TECHNICAL FIELD

The present disclosure relates to a modeling method for a tubular structure, and in particular, relates to a modeling method and system capable of creating a tubular structure from a non-manifold wire-frame structure, and a non-transitory computer-readable storage medium thereof.

BACKGROUND

Creating a tubular structure from a wire-frame structure is critical in the field of generative modeling. Some wire-frames contain non-manifold nodes. At least three line segments are connected to a non-manifold node. At present, no effective modeling method is available for creating a tubular structure from such non-manifold wire-frames.

SUMMARY

Embodiments of the present disclosure are intended to provide a modeling method for a tubular structure, which is capable of creating a tubular structure from a non-manifold wire-frame structure.

Embodiments of the present disclosure are further intended to provide a non-transitory computer-readable storage medium, which is capable of creating a tubular structure from a non-manifold wire-frame structure.

Embodiments of the present disclosure are still further intended to provide a modeling system for a tubular structure, which is capable of creating a tubular structure from a non-manifold wire-frame structure.

The method for modeling the tubular structure includes: acquiring a structural wire-frame, the structural wire-frame being constituted by a plurality of line units that are connected by nodes and present in the form of line segments; generating, at each non-manifold node of non-manifold nodes of the structural wire-frame, a polyhedral structure formed by faces of a polyhedron, edges of the polyhedral structure forming a plurality of quadrilateral connecting wire-frames, each line unit of the line units corresponding to the polyhedral structure running through one of the connecting wire-frames; generating, at each manifold node of manifold nodes of the structural wire-frame, a square connecting face with the manifold node as a center point, and generating, at each end node of end nodes of the structural wire-frame, a square end face with the end node as a center point; among the line units: for a line unit with one end being a non-manifold node and the other end being a manifold node, connecting, in one-to-one correspondence, vertices of the connecting wire-frame to vertices of the connecting face traveled by the line unit and forming a tube; for a line unit with both ends being manifold nodes, connecting, in one-to-one correspondence, vertices of two faces of the connecting faces and forming a tube; for a line unit with one end being a non-manifold node and the other end being an end node, connecting, in one-to-one correspondence, vertices of the connecting wire-frame to vertices of the end face traveled by the line unit and forming a tube; for a line unit with one end being a manifold node and the other end being an end node, connecting, in one-to-one correspondence, vertices of the connecting face to vertices of the end face and forming a tube; and for a line unit with both ends being non-manifold nodes, connecting, in one-to-one correspondence, vertices of the connecting wire-frame traveled by two of the line units and forming a tube; and carrying out curved-surface subdivision.

The method is capable of creating a tubular structure from a non-manifold wire-frame structure.

In another embodiment, acquiring the structural wire-frame includes: acquiring a primary wire-frame, the primary wire-frame being constituted by line segments/or curved segments; partitioning the curved segments in the primary wire-frame into a plurality of line segments with heads and tails connected; inserting nodes at intersections of the line segments; and fusing, with a non-manifold node, a node whose distance to the non-manifold node is less than or equal to a first length, and fusing, with a manifold node, a node whose distance to the manifold node is less than or equal to a second length. In this way, adaptability of the method is improved.

In still another embodiment, acquiring the structural wire-frame further includes, for a line segment at a manifold node with a line segment included angle being less than or equal to 90 degrees, inserting a node in a line segment with ⅓ of a length thereof being greater than or equal to the second length, a distance between the inserted node and the manifold node being equal to the second length. In this way, the problem that the tubular structure becomes thinner at the position corresponding to the manifold node is solved.

In still another embodiment, the structural wire-frame is acquired by brush drawing or parameterization drawing.

In still another embodiment, partitioning the curved segments is practiced by isometric sampling or chord height error control sampling.

In still another embodiment, the polyhedral structure is generated by triangular prism enumeration. The triangular prism enumeration is applicable to the non-manifold node with three line units. The triangular prism enumeration includes defining the polyhedral structure to be constituted by faces of a single triangular prism, and a distance from each vertex of vertices of the polyhedral structure to the non-manifold node is equal to a first length. Each line unit of the line units is intersected with a side face of the polyhedral structure. The triangular prism enumeration provides that the connecting wire-frame has good uniformity. The uniformity of the connecting wire-frame is interpreted as degree of uniformity of the shape and size of the connecting wire-frame.

In still another embodiment, in the triangular prism enumeration, a spatial direction of the polyhedral structure is determined by: defining a normal of a triangle formed by nodes that are not connected to the three line units as a direction of a side edge of the polyhedral structure, and causing a sum of included angles defined by perpendiculars of three side faces of the polyhedral structure and the corresponding line units to be minimum. In this way, uniformity of the tubular structure is improved. The uniformity of the tubular structure is interpreted as degree of uniformity of the shape and size of the cross-section of the tubular structure.

In still another embodiment, the polyhedral structure is generated by cube enumeration. The cube enumeration is applicable to the non-manifold node with three to six line units. The cube enumeration includes defining the polyhedral structure to be constituted by faces of a single cube; and a distance from each vertex of vertices of the polyhedral structure to the non-manifold node is equal to a first length. Each line unit of the line units is intersected with a side face of the polyhedral structure. The cube enumeration provides that the connecting wire-frame has good uniformity.

In still another embodiment, in the cube enumeration, vertical directions corresponding to all the line unit pairs with an included angle being greater than 60 degrees are averaged and an average value is taken as a spatial direction of the polyhedral structure. In this way, the tubular structure is more uniform.

In still another embodiment, the polyhedral structure is generated by a convex hull process. The convex hull process includes: creating a square reference face for each line unit of the line units, the line unit being vertical to the reference face and running through a center point of the reference face, wherein if the reference faces are intersected, side lengths of the reference faces are decreased and/or distances between the reference faces and the non-manifold node are increased such that the reference faces are not intersected; and creating, using vertices of all the reference faces as vertices of the polyhedral structure, the polyhedral structure by a convex hull algorithm. The convex hull process has good adaptability.

In still another embodiment, in the convex hull process, initial side lengths of the reference faces are defined to be equal to a first length/sqrt(2), and initial distances between the reference face and the non-manifold node are defined to be equal to the first length. If the reference faces are intersected, the side lengths of the reference faces are first decreased, with a decrease ratio not less than 0.7. If the reference faces are still intersected after the side lengths of the reference faces are decreased, the distances between the reference faces and the non-manifold node are increased, with an increase ratio not greater than 1.5. In this way, side lengths of the reference faces are decreased and/or distances between the reference faces and the non-manifold node are increased.

In still another embodiment, the polyhedral structure is generated by a sphere division process. The sphere division process includes: creating a sphere with a non-manifold node as a center, a radius of the sphere being equal to a first length; marking a plurality of positioning points on the sphere, the plurality of positioning points enclosing a plurality of the connecting wire-frames; and creating the polyhedral structure using all the positioning points as vertices of the polyhedral structure. The sphere division has good adaptability.

In still another embodiment, the sphere division process includes: creating a sphere A with a non-manifold node as a center, a radius of the sphere A being equal to the first length, wherein three line units are intersected with the sphere A at a point b0, a point b1, and a point b2; calculating a normal of a triangle b0b1b2, and creating a straight line L parallel to the normal and running through the center, wherein the straight line L is intersected with the sphere A at a point q0 and a point q1, and a plane where the triangle b0b1b2 is located is intersected with the sphere A to obtain a circle R, a perpendicular of a line b0b1 is intersected with the circle R at a point t0, a perpendicular of a line b1b2 is intersected with the circle R at a point t1, a perpendicular of a line b2b0 is intersected with the circle R at a point t2, and the point q0, the point q1, the point t0, the point t1, and the point t2 constitute three quadrilaterals, and the three line units run through the three quadrilaterals in one-to-one correspondence; adding the remaining line units one by one, wherein each line unit of the newly added line units is intersected with the sphere A at a point Pnew, the added line unit running through the quadrilateral corresponding to the point Pnew is intersected with the sphere A at a point Pold; and selecting vertices of a diagonal, more approximately vertical to a line PnewPold, of a corresponding quadrilateral, and connecting the vertices to a projection point B of a midpoint of the line PnewPold on the sphere A to partition the original quadrilateral into two new quadrilaterals; and using vertices of all the finally formed quadrilaterals as the positioning points, and creating the polyhedral structure using all the positioning points as the vertices of the polyhedral structure. In this way, uniformity of the tubular structure is improved.

In still another embodiment, distances from a center point of the connecting face to the vertices of the connecting face are equal to a second length. Distances from a center point of the end face to the vertices of the end face are equal to the second length. Spatial angles of the connecting face and the end face are both calculated by a double reflection algorithm. In this way, uniformity of the tubular structure is improved.

In still another embodiment, the method further includes marking edges of at least part of the end faces as being acute. In this way, the end face may remain unchanged in the subsequent subdivision process.

In still another embodiment, the method further includes adding a cross-section to the formed tube, wherein a distance from an intersection point between the line unit and the polyhedral structure to the cross-section is equal to a smooth region size, and then the curved-surface subdivision is carried out. In this way, the size of the tubular structure at the non-manifold node may be controlled.

Embodiments of the present disclosure further provide a non-transitory computer-readable storage medium storing a computer program therein, wherein the computer program, when running on a processor, causes the processor to perform the method for modeling the tubular structure as described above. By the computer-readable storage medium, a tubular structure from a non-manifold wire-frame structure is created.

Embodiments of the present disclosure further provide a modeling system for a tubular structure. The system includes a processor and a memory storing a computer program, wherein the processor, when running the computer program, is caused to perform the modeling method for the tubular structure as described above. By the modeling system, a tubular structure from a non-manifold wire-frame structure is created.

BRIEF DESCRIPTION OF THE DRAWINGS

The accompanying drawings are merely for schematic and illustrative description and demonstration of the present disclosure, instead of limiting the scope of the present disclosure.

FIG. 3 to FIG. 13 are examples illustrating the modeling method for the tubular structure;

Figure 1:
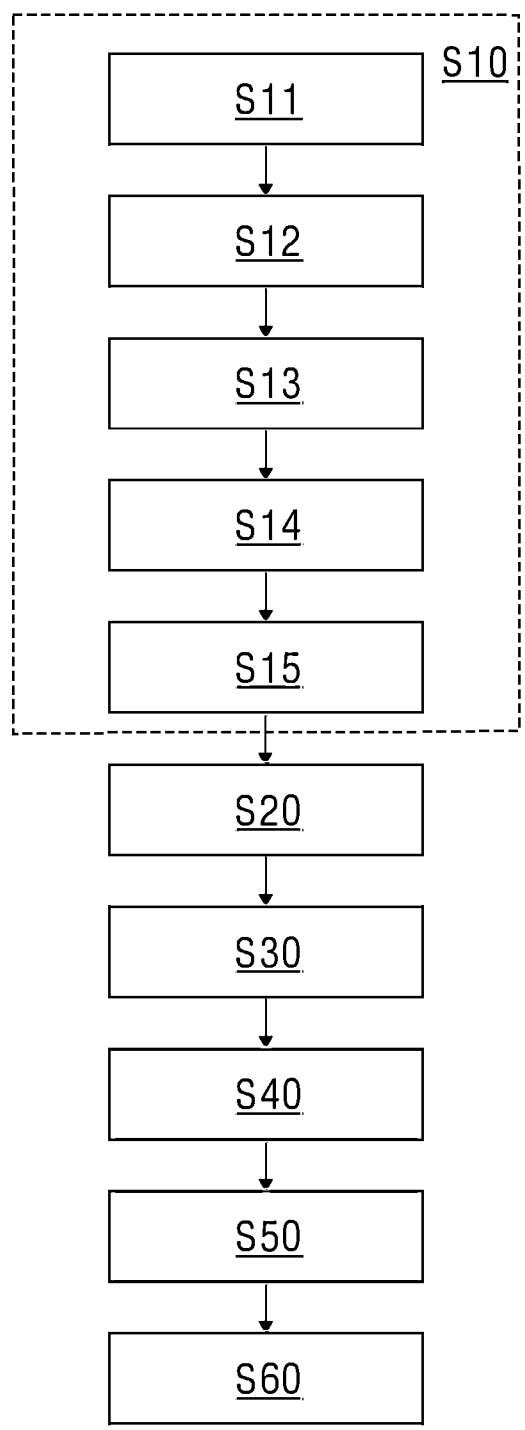
FIG. 1 is a flowchart of a modeling method for a tubular structure according to an embodiment of the present disclosure.

Reference numerals and denotations thereof include: 100—Modeling system for a tubular structure; 101—Memory; and 102—Processor.

DETAILED DESCRIPTION

For clearer descriptions of the technical features, objectives, and the technical effects of the present disclosure, the specific embodiments of the present disclosure are hereinafter described with reference to the accompanying drawings. In the drawings, like reference numerals denote elements having the same structure or having the similar structure but the same function.

In this text, the term "exemplary" is used herein to mean "serving as an example, instance, or illustration," and any illustration or embodiment described herein as "exemplary" shall not be necessarily construed as preferred or advantageous over other illustrations or embodiments.

In this text, the terms "first," "second," and the like do not represent degrees of importance or a sequence, but only for differentiation, and for ease of description.

For brevity, parts relevant to the present disclosure are merely illustrated in the drawings, and these parts do not denote the actual structure of the product.

An embodiment of the present disclosure provides a modeling method for a tubular structure. As illustrated in FIG. 1, in an embodiment, the method includes acts S10 to S60.

In S10, a structural wire-frame is acquired. The structural wire-frame is constituted by a plurality of line units that are connected by nodes and present in the form of line segments. The structural wire-frame may be two-dimensional or three dimensional.

In some embodiments, the structural wire-frame may be directly acquired by brush drawing or parameterization drawing. In some other embodiments, the structural wire-frame may also be acquired by pre-processing an initial wire-frame. The initial wire-frame may be constituted by line segments and/or curved segments. Such configuration is employed in this embodiment. As illustrated in FIG. 1, the method includes acts S11 to S15.

In S11, a primary wire-frame is acquired, wherein the initial wire-frame may be, for example, acquired by brush drawing or parameterization drawing.

In S12, curved segments in the primary wire-frame are partitioned into a plurality of line segments with heads and tails connected. Partitioning the curved segments is practiced by isometric sampling or chord height error control sampling. The isometric sampling is interpreted as defining a length of the line segment, and the chord height error control sampling is interpreted as defining a height of a chord corresponding to a line segment.

Figure 3:

FIG. 3 illustrates curved segments before partitioning by isometric sampling (drawn by solid lines), and line segments after partitioning (drawn by dotted lines). If the primary wire-frame does not contain curved segments, this act may be omitted.

In S13, nodes are inserted at intersections of the line segments.

FIG. 4 illustrates line segments before nodes are inserted (drawn by solid lines), line segments after nodes are inserted (drawn by dotted lines), and a new added node 0. If the line segments are not intersected, this act may be omitted.

In S14, a node whose distance to the non-manifold node is less than or equal to a first length is fused with a non-manifold node, and a node whose distance to the manifold node is less than or equal to a second length is fused with a manifold node. The non-manifold node refers to a node shared by three or more than three line segments, and the manifold node refers to a node shared by two line segments. The first length and the second length may be both defined according to the actual needs.

Figure 5:
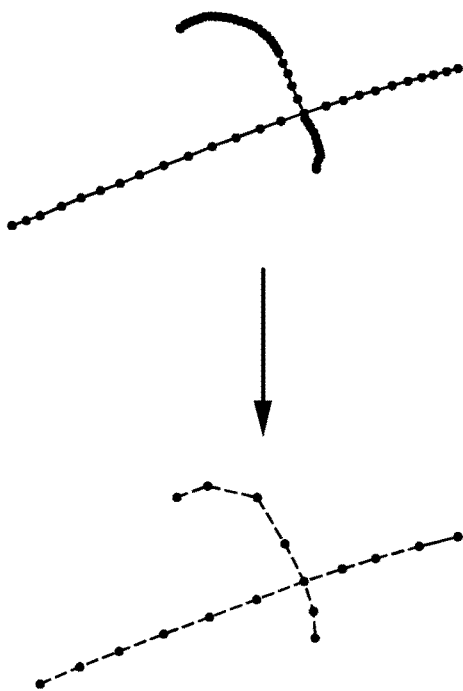

FIG. 5 illustrates line segments before fusing (drawn by solid lines), and line segments after fusing (drawn by dotted lines).

In S15, for a line segment at a manifold node with a line segment included angle being less than or equal to 90 degrees, a node is inserted in a line segment with ⅓ of a length thereof being greater than or equal to the second length, wherein a distance between the inserted node and the manifold node is equal to the second length. In addition, a node is inserted in a line segment with ⅓ of a length thereof being greater than or equal to the second length and with one end being an end node, wherein a distance between the inserted node and the end node is equal to the second length. The end node refers to a node which is exclusively connected to a single line segment.

Figure 6:
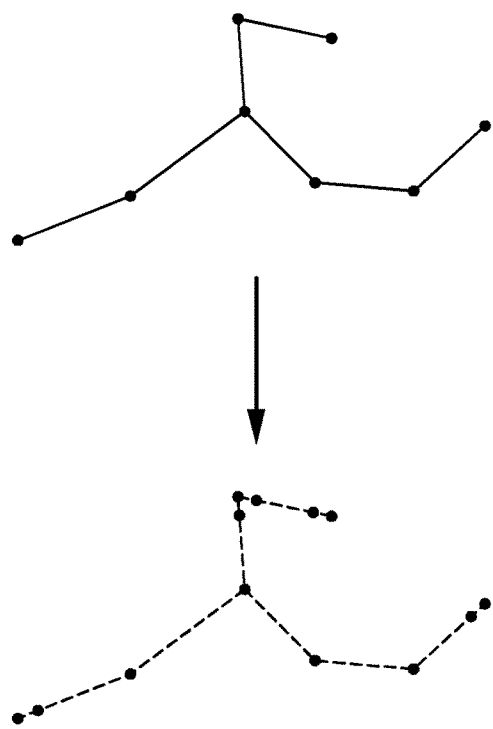

FIG. 6 illustrates line segments before nodes are inserted (drawn by solid lines), and line segments after nodes are inserted (drawn by dotted lines). In this way, the problem that the tubular structure becomes thinner at the positions corresponding to the manifold node and the end node is solved. If this problem does not need to be solved, this act may be omitted.

In S20, a polyhedral structure formed by faces of a polyhedron is generated at each non-manifold node of non-manifold nodes of the structural wire-frame. Edges of the polyhedral structure form a plurality of quadrilateral connecting wire-frames, and each line unit of the line units corresponding to the polyhedral structure runs through one of the connecting wire-frames;

The polyhedral structure may be generated by any one of triangular prism enumeration, cube enumeration, a convex hull process, and sphere division, or a combination thereof. Different processes may be employed for different non-manifold nodes. The four processes are described in detail hereinafter.

The triangular prism enumeration is applicable to the non-manifold node with three line units. The triangular prism enumeration includes defining the polyhedral structure to be constituted by five faces of a single triangular prism, and a distance from each vertex of vertices of the polyhedral structure to the non-manifold node is equal to a first length. Each line unit of the line units is intersected with a side face of the polyhedral structure, and four edges of each side face constitute a connecting wire-frame.

Figure 7:
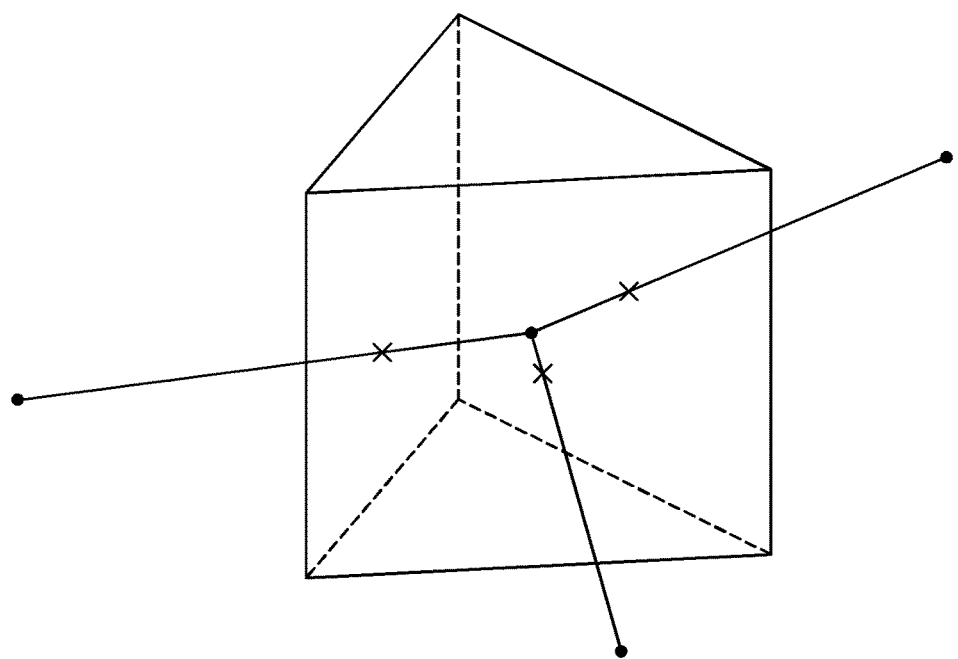

FIG. 7 illustrates a polyhedral structure generated by the triangular prism enumeration, wherein x represents an intersection point between a line unit and the polyhedral structure.

In the triangular prism enumeration, a spatial direction of the polyhedral structure is determined by an optimization method including: defining a normal of a triangle formed by nodes that are not connected to the three line units as a direction of a side edge of the polyhedral structure, and causing a sum of included angles defined by perpendiculars of three side faces of the polyhedral structure and the corresponding line units to be minimum. As further interpreted, the included angle defined by the perpendicular of a first side face and a line unit intersected therewith is a first included angle, the included angle defined by the perpendicular of a second side face and a line unit intersected therewith is a second included angle, the included angle defined by the perpendicular of a third side face and a line unit intersected therewith is a third included angle, and a sum of the first included angle, the second included angle, and the third included angle is made to be minimum. In this way, degree of twist of the tubular structure is reduced, and the tubular structure is made more uniform.

The cube enumeration is applicable to the non-manifold node with three to six line units. The cube enumeration includes defining the polyhedral structure to be constituted by six faces of a single cube; and a distance from each vertex of vertices of the polyhedral structure to the non-manifold node is equal to a first length. Each line unit of the line units is intersected with a face of the polyhedral structure, and four edges of each face intersected with the line unit constitute a connecting wire-frame.

In the cube enumeration, the spatial direction of the polyhedral structure may be determined by an optimization method. Specifically, the optimization method includes: averaging vertical directions corresponding to all the line unit pairs with an included angle being greater than 60 degree and taking an average value as a spatial direction of the polyhedral structure (that is, a direction of an edge of a cube). A line unit pair is constituted any two of a plurality of line units. For example, three line units may constitute three combinations, that is, three line unit pairs. The vertical direction of the line unit pair refers to a direction that is simultaneously vertical to two line units of the line unit pair.

The convex hull process includes: creating a square reference face for each line unit of the line units, wherein the line unit is vertical to the reference face and runs through a center point of the reference face.

Figure 8:
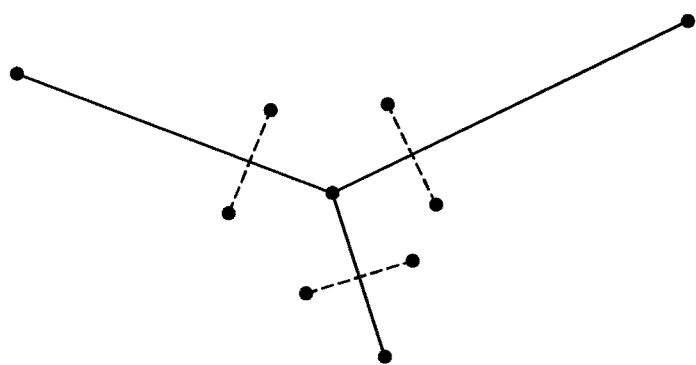

In FIG. 8, the created reference face is illustrated by dotted lines. If the reference faces are intersected, side lengths of the reference faces are decreased and/or distances between the reference faces and the non-manifold node are increased such that the reference faces are not intersected. Finally, the polyhedral structure is created using vertices of all the reference faces as vertices of the polyhedral structure by a convex hull algorithm.

Figure 9:
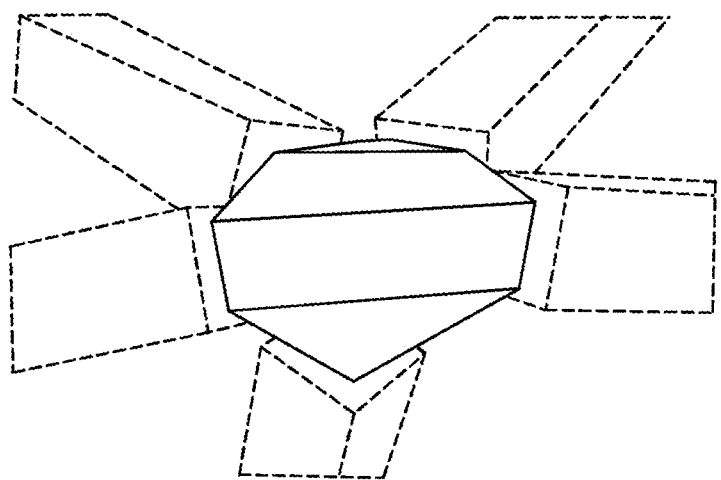

FIG. 9 illustrates, with solid lines, a polyhedral structure created by a convex hull process.

To make the tubular structure more uniform, in the convex hull process, initial side lengths of the reference faces are further defined to be equal to a first length/sqrt(2), and initial distances between the reference face and the non-manifold node are further defined to be equal to the first length. If the reference faces are intersected, the side lengths of the reference faces are first decreased, with a decrease ratio not less than 0.7. If the reference faces are still intersected after the side lengths of the reference faces are decreased by a decrease ratio of 0.7, the distances between the reference faces and the non-manifold node are increased, with an increase ratio not greater than 1.5. If the reference faces are still intersected, another process, for example, a sphere division process, may be employed.

The sphere division process includes creating a sphere A with a non-manifold node as a center, wherein a radius of the sphere A is equal to the first length. A plurality of positioning points are marked on the sphere, wherein the plurality of positioning points enclose a plurality of the connecting wire-frames. The polyhedral structure is created using all the positioning points as vertices of the polyhedral structure.

Figure 2:
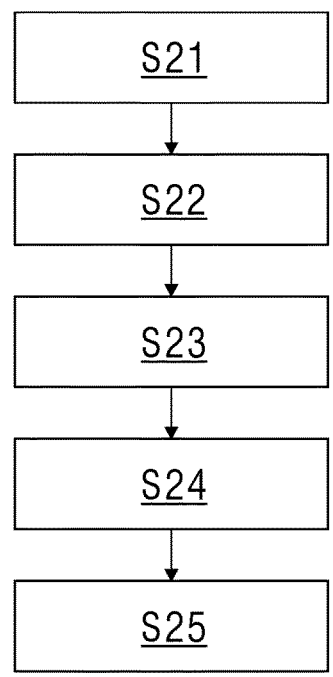
FIG. 2 is a flowchart of a sphere division process to an embodiment of the present disclosure.

As illustrated in FIG. 2, to make the tubular structure more uniform, the sphere division may be optimized to include acts S21 to S25.

Figure 10:
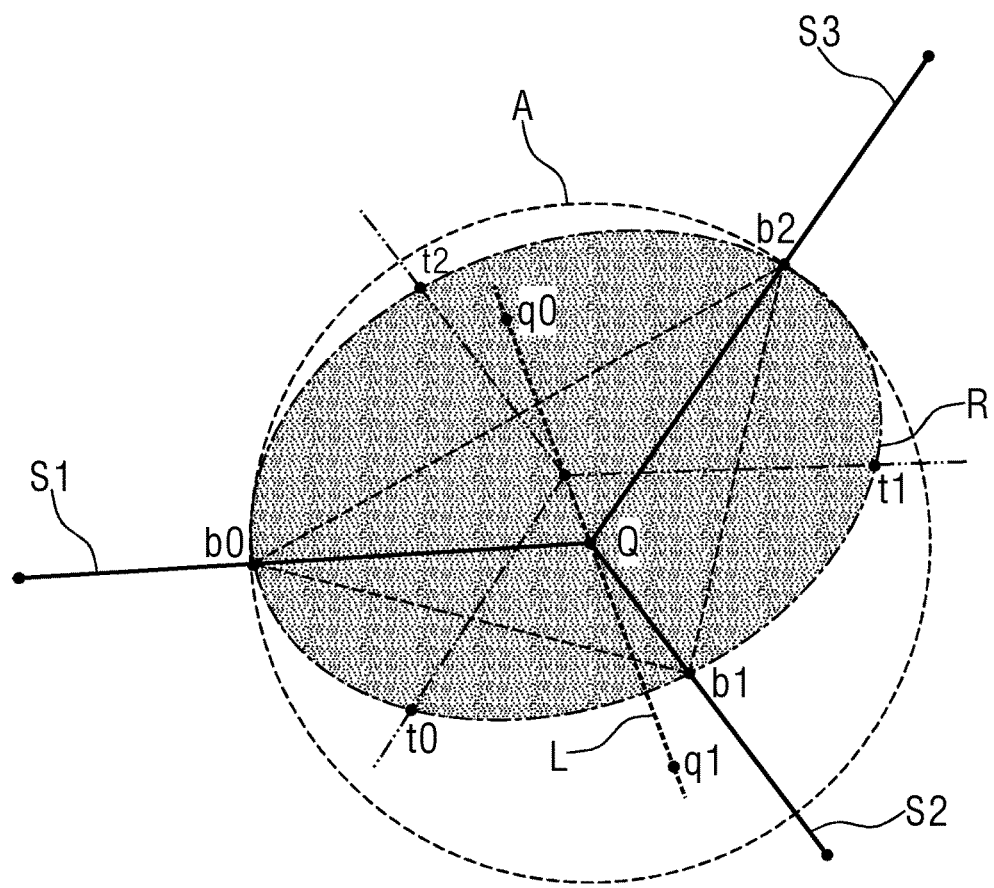

In S21, referring to FIG. 10, a sphere A is created with a non-manifold node Q as a center, wherein a radius of the sphere A is equal to the first length, wherein three line units S1, S2, and S3 are intersected with the sphere A at a point b0, a point b1, and a point b2.

In S22, a normal of a triangle b0b1b2 is calculated, and a straight line L parallel to the normal and running through the center Q is created.

In S23, a plane where the triangle b0b1b2 is located is intersected with the sphere A to obtain a circle R, a perpendicular (drawn by two-dot chain lines) of a line b0b1 is intersected with the circle R at a point t0, a perpendicular (drawn by two-dot chain lines) of a line b1b2 is intersected with the circle R at a point t1, a perpendicular (drawn by two-dot chain lines) of a line b2b0 is intersected with the circle R at a point t2, and the point q0, the point q1, the point t0, the point t1, and the point t2 constitute three quadrilaterals, that is, a quadrilateral q0t2q1t0, a quadrilateral q0t0q1t1, and a quadrilateral q0t1q1t2. The line unit S1 runs through the quadrilateral q0t2q1t0, the line unit S2 runs through the quadrilateral q0t0q1t1, and the line unit S3 runs through the quadrilateral q0t1q1t2.

In S24, the remaining line units are added one by one.

Figure 11:
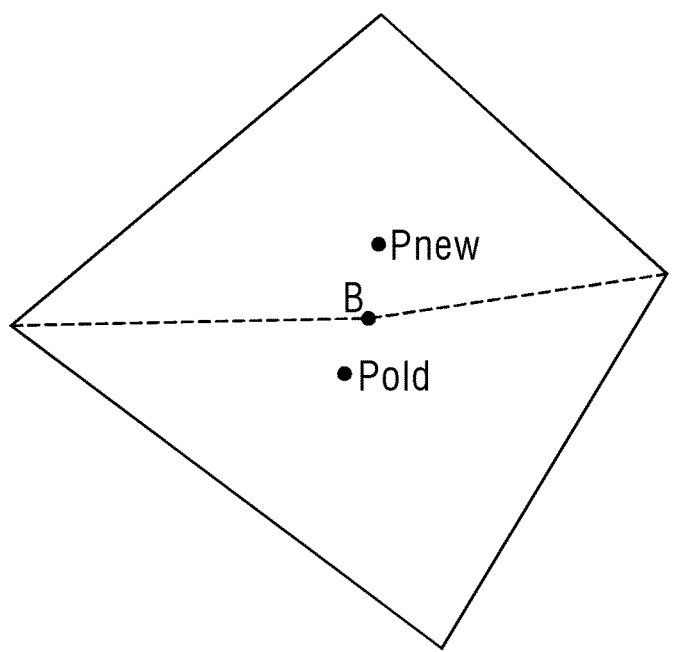

Referring to FIG. 11, each line unit of the newly added line units is intersected with the sphere A at a point Pnew, the added line unit running through the quadrilateral (drawn by a solid line) corresponding to the point Pnew is intersected with the sphere A at a point Pold; and selecting vertices of a diagonal, more approximately vertical to a line PnewPold, of a corresponding quadrilateral, and connecting the vertices to a projection point B of a midpoint of the line PnewPold on the sphere A to partition the original quadrilateral into two new quadrilaterals, wherein a direction of the projection is a radial direction (the connecting line is drawn by dotted lines) of the sphere. Each quadrilateral of the finally formed quadrilaterals is a connecting wire-frame. It may be understood that if the non-manifold node only involves three line units, this act may be omitted.

In S25, vertices of all the finally formed quadrilaterals are used as the positioning points, and the polyhedral structure is created using all the positioning points as the vertices of the polyhedral structure.

Figure 12:
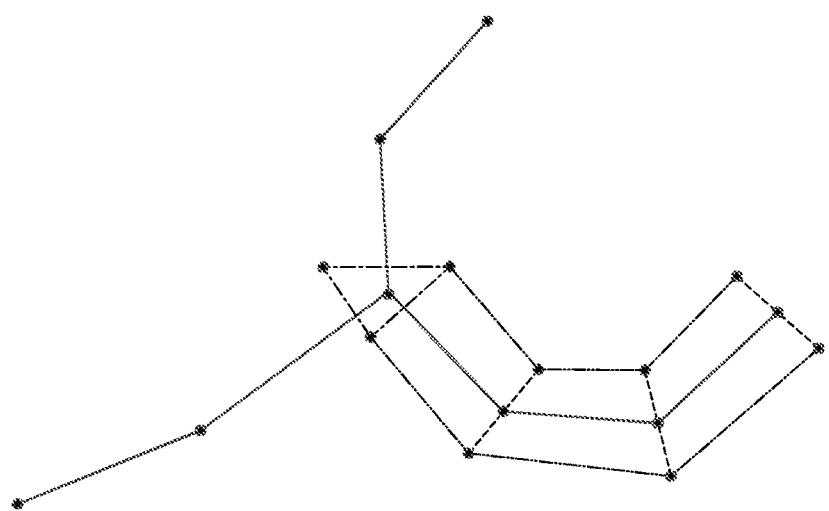

In S30, as illustrated in FIG. 12, a square connecting face (draw by dotted lines) with the manifold node as a center point is generated generating at each manifold node of manifold nodes of the structural wire-frame, and a square end face (drawn by dotted lines) with the end node as a center point is generated at each end node of end nodes of the structural wire-frame. In FIG. 12, the line units are drawn by solid lines, and the polyhedral structures are drawn by dotted lines.

In S40, referring to FIG. 12, for a line unit with one end being a non-manifold node and the other end being a manifold node, vertices of the connecting wire-frame are connected in one-to-one correspondence to vertices of the connecting face traveled by the line unit and a tube is formed. For a line unit with both ends being manifold nodes, vertices of two of the connecting faces are connected in one-to-one correspondence and a tube is formed. For a line unit with one end being a non-manifold node and the other end being an end node, vertices of the connecting wire-frame are connected in one-to-one correspondence to vertices of the end face traveled by the line unit and a tube is formed. For a line unit with one end being a manifold node and the other end being an end node, vertices of the connecting face are connected in one-to-one correspondence to vertices of the end face and a tube is formed. For a line unit with both ends being non-manifold nodes, vertices of the connecting wire-frame traveled by two of the line units are connected in one-to-one correspondence and a tube is formed. A suitable connection fashion may be selected to provide that degree of twist of the tube is the minimum. In FIG. 12, the connecting line added in this act is marked by two-dot chain lines.

In S40, exemplarily, distances from a center point of the connecting face to the vertices of the connecting face are made equal to a second length, distances from a center point of the end face to the vertices of the end face are made equal to the second length. Angles of the connecting face and the end face are both calculated by a double reflection algorithm. In this way, the tubular structure is more uniform.

In S40, edges of at least part of the end faces are marked as being acute. In this way, the end face may remain unchanged in the subsequent subdivision process. Nevertheless, the end face may also be removed (but the edge of the end face is maintained) to obtain an open end.

In S50, a cross-section is added to the formed tube, wherein a distance from an intersection point between the line unit and the polyhedral structure to the cross-section is made equal to a smooth region size.

Figure 13:
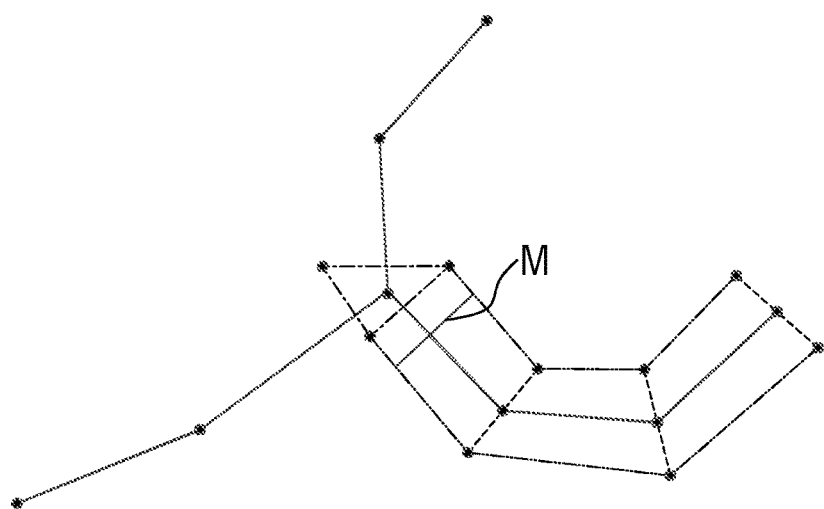

FIG. 13 illustrates a cross-section M newly added based on FIG. 12. The smooth region size may be determined according to the actual needs. In this way, the size of the tubular structure at the non-manifold node may be controlled.

In S60, the curved-surface subdivision is carried out. The curved-surface subdivision is, for example, Catmull-Clark subdivision.

The method is capable of creating a tubular structure from a non-manifold wire-frame structure. The modeling method for the tubular structure may be, for example, practiced by the NX software from Siemens.

Figure 15:
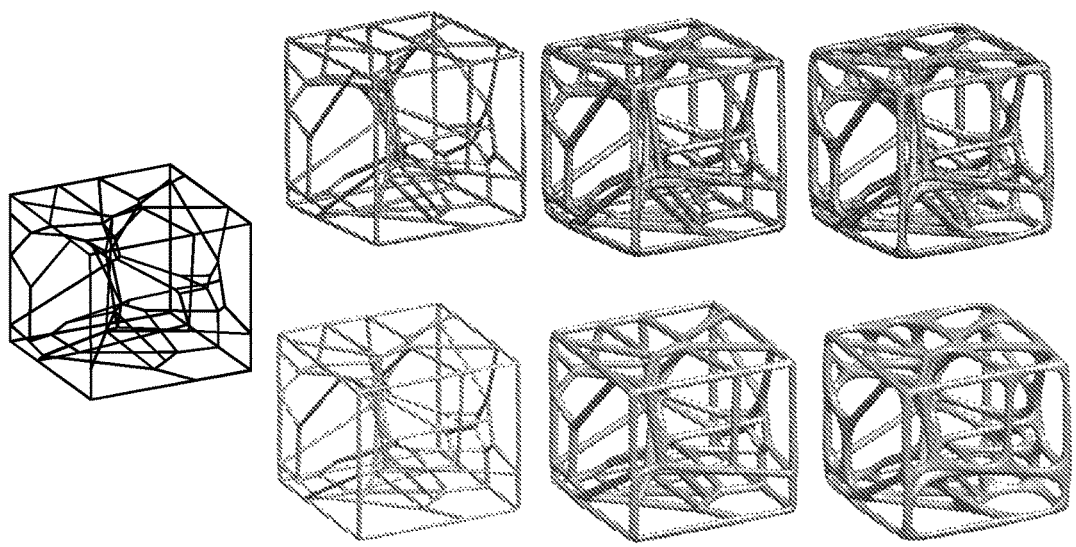
FIG. 15 is a schematic diagram of examples illustrating a structural wire-frame and a tubular structure.

FIG. 15 illustrates an example of a structural wire-frame (the leftmost structure in the drawing), and a tubular structure (the right six structures) created by the modeling method based on the tubular structure in the NX software. The upper three structures are tubular structures in a curved shape that are created by the Catmull-Clark subdivision, and combinations of different first lengths and smooth region sizes are employed. The lower three structures are tubular structures in a mesh shape that are created by the Catmull-Clark subdivision, and combinations of different first lengths and smooth region sizes.

An embodiment of the present disclosure further provides a non-transitory computer-readable storage medium. In an embodiment, the non-transitory computer-readable storage medium stores a computer program therein; wherein the computer program, when running on a processor, causes the processor to perform the modeling method for the tubular structure as described above. By the computer-readable storage medium, a tubular structure from a non-manifold wire-frame structure is created.

Figure 14:
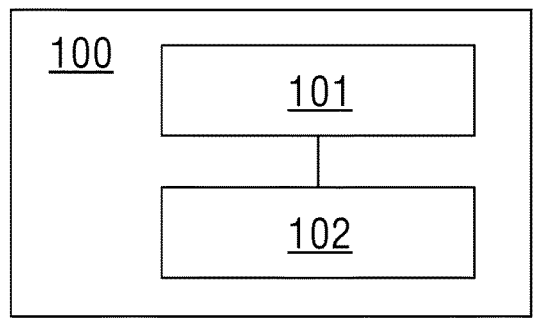
FIG. 14 is a structural block diagram of a modeling system for a tubular structure according to an embodiment of the present disclosure.

The present disclosure further provides a modeling system for a tubular structure. As illustrated in FIG. 14, an embodiment of the present disclosure further provides a modeling system 400 for a tubular structure. The modeling system 400 includes a processor 102 and a memory 101 storing a computer program; wherein the processor, when running the computer program, is caused to perform the modeling method for the tubular structure as described above. By the modeling system, a tubular structure from a non-manifold wire-frame structure is created.

It should be understood that, although this specification is described based on the embodiments, not each embodiment discloses an independent technical solution. Such description manner of the specification is only for clarity. A person skilled in the art should consider the specification as an entirety. The technical solutions according to the embodiments may also be suitably combined to derive other embodiments that may be understood by a person skilled in the art.

A series of detailed descriptions given in this specifically are merely intended to illustrate feasible embodiments of the present disclosure, instead of limiting the protection scope of the present disclosure. Any equivalent embodiments or modifications, for example, combinations, segmentations, or repetition of features, derived without departing from the spirit of the present disclosure shall fall within the protection scope of the present disclosure.

What is claimed is:

1. A modeling method for a tubular structure, the method comprising:
acquiring a structural wire-frame, the structural wire-frame being constituted by a plurality of line units that are connected by nodes and present in a form of line segments;
generating, at each non-manifold node of non-manifold nodes of the structural wire-frame, a polyhedral structure formed by faces of a polyhedron, edges of the polyhedral structure forming a plurality of quadrilateral connecting wire-frames, each line unit of the line units corresponding to the polyhedral structure running through one connecting wire-frame of the plurality of quadrilateral connecting wire-frames;
generating, at each manifold node of manifold nodes of the structural wire-frame, a square connecting face with the manifold node as a center point;
generating, at each end node of end nodes of the structural wire-frame, a square end face with the end node as a center point;
connecting, for a line unit with one end being a non-manifold node and the other end being a manifold node, in one-to-one correspondence, vertices of the connecting wire-frame to vertices of the connecting face traveled by the line unit and forming a tube;
connecting, for a line unit with both ends being manifold nodes, in one-to-one correspondence, vertices of two of the connecting faces and forming a tube;
connecting, for a line unit with one end being a non-manifold node and the other end being an end node, in one-to-one correspondence, vertices of the connecting wire-frame to vertices of the end face traveled by the line unit and forming a tube;
connecting, for a line unit with one end being a manifold node and the other end being an end node, in one-to-one correspondence, vertices of the connecting face to vertices of the end face and forming a tube;
connecting, for a line unit with both ends being non-manifold nodes, in one-to-one correspondence, vertices of the connecting wire-frame traveled by two of the line units and forming a tube; and
carrying out a curved-surface subdivision.

2. The method of claim 1, wherein the acquiring of the structural wire-frame comprises:
acquiring a primary wire-frame, the primary wire-frame being constituted by line segments/or curved segments;
partitioning the curved segments in the primary wire-frame into a plurality of line segments with heads and tails connected;
inserting nodes at intersections of the plurality of line segments;
fusing, with a non-manifold node, a node whose distance to the non-manifold node is less than or equal to a first length; and fusing, with a manifold node, a node whose distance to the manifold node is less than or equal to a second length.

3. The method of claim 2, wherein the acquiring of the structural wire-frame further comprises: for a line segment at a manifold node with a line segment included angle being less than or equal to 90 degrees, inserting a node in a line segment with one-third of a length thereof being greater than or equal to the second length, a distance between the inserted node and the manifold node being equal to the second length.

4. The method of claim 2, wherein the structural wire-frame is acquired by brush drawing or parameterization drawing.

5. The method of claim 2, wherein the partitioning of the curved segments is practiced by isometric sampling or chord height error control sampling.

6. The method of claim 1, wherein the polyhedral structure is generated by triangular prism enumeration, the triangular prism enumeration being applicable to the non-manifold node with three line units, and
wherein the triangular prism enumeration comprises defining the polyhedral structure to be constituted by faces of a single triangular prism, a distance from each vertex of vertices of the polyhedral structure to the non-manifold node is equal to a first length, and each line unit of the line units is intersected with a side face of the polyhedral structure.

7. The method of claim 6, wherein, in the triangular prism enumeration, a spatial direction of the polyhedral structure is determined by: defining a normal of a triangle formed by nodes that are not connected to the three line units as a direction of a side edge of the polyhedral structure, and causing a sum of included angles defined by perpendiculars of three side faces of the polyhedral structure and the corresponding line units to be a minimum.

8. The method of claim 1, wherein the polyhedral structure is generated by cube enumeration, the cube enumeration being applicable to the non-manifold node with three to six line units,
wherein the cube enumeration comprises defining the polyhedral structure to be constituted by faces of a single cube, a distance from each vertex of vertices of the polyhedral structure to the non-manifold node is equal to a first length, and each line unit of the line units is intersected with a side face of the polyhedral structure.

9. The method of claim 8, wherein, in the cube enumeration, vertical directions corresponding to all line unit pairs with an included angle being greater than 60 degrees are averaged and an average value is taken as a spatial direction of the polyhedral structure.

10. The method of claim 1, wherein the polyhedral structure is generated by a convex hull process comprising:
creating a square reference face for each line unit of the line units, the line unit being vertical to the reference face and running through a center point of the reference face, wherein when the reference faces are intersected, side lengths of the reference faces are decreased and/or distances between the reference faces and the non-manifold node are increased such that the reference faces are not intersected; and
creating, using vertices of all the reference faces as vertices of the polyhedral structure, the polyhedral structure by a convex hull algorithm.

11. The method of claim 10, wherein, in the convex hull process, initial side lengths of the reference faces are defined to be equal to a first length/sqrt (2), and initial distances between the reference face and the non-manifold node are defined to be equal to the first length,
wherein, when the reference faces are intersected, the side lengths of the reference faces are first decreased, with a decrease ratio not less than 0.7, and
wherein, when the reference faces are still intersected after the side lengths of the reference faces are decreased, the distances between the reference faces and the non-manifold node are increased, with an increase ratio not greater than 1.5.

12. The method of claim 1, wherein the polyhedral structure is generated by a sphere division process comprising:
creating a sphere with a non-manifold node as a center, wherein a radius of the sphere is equal to a first length;
marking a plurality of positioning points on the sphere, the plurality of positioning points enclosing connecting wire-frames of the plurality of quadrilateral connecting wire-frames; and
creating the polyhedral structure using all the positioning points as vertices of the polyhedral structure.

13. The method of claim 12, wherein the sphere division process comprises:
creating a sphere A with a non-manifold node as a center, wherein a radius of the sphere A is equal to the first length, and wherein three line units are intersected with the sphere A at a point b0, a point b1, and a point b2;
calculating a normal of a triangle b0b1b2, and creating a straight line L parallel to the normal and running through the center, wherein the straight line L is intersected with the sphere A at a point q0 and a point q1, and wherein a plane where the triangle b0b1b2 is located is intersected with the sphere A to obtain a circle R, a perpendicular of a line b0b1 is intersected with the circle R at a point t0, a perpendicular of a line b1b2 is intersected with the circle R at a point t1, a perpendicular of a line b2b0 is intersected with the circle R at a point t2, and the point q0, the point q1, the point t0, the point t1, and the point t2 constitute three quadrilaterals, and the three line units run through the three quadrilaterals in one-to-one correspondence; and
adding the remaining line units one by one, wherein each added line unit of newly added line units is intersected with the sphere A at a point Pnew, the added line unit running through the quadrilateral corresponding to the point Pnew is intersected with the sphere A at a point Pold; and selecting vertices of a diagonal, more approximately vertical to a line PnewPold, of a corresponding quadrilateral, and connecting the vertices to a projection point B of a midpoint of the line PnewPold on the sphere A to partition the original quadrilateral into two new quadrilaterals; and
using vertices of all finally formed quadrilaterals as the positioning points and creating the polyhedral structure using all the positioning points as the vertices of the polyhedral structure.

14. The method of claim 1, wherein distances from the center point of the connecting face to the vertices of the connecting face are equal to a second length,
wherein distances from the center point of the end face to the vertices of the end face are equal to the second length, and
wherein spatial angles of the connecting face and the end face are both calculated by a double reflection algorithm.

15. The method of claim 1, further comprising:
marking edges of at least part of the end faces as being acute.

16. The method of claim 1, further comprising:
adding a cross-section to the formed tube, wherein a distance from an intersection point between the line unit and the polyhedral structure to the cross-section is equal to a smooth region size, and
wherein the curved-surface subdivision is subsequently carried out.

17. A non-transitory computer-readable storage medium storing a computer program therein, wherein the computer program, when running on a processor, causes the processor to:
acquire a structural wire-frame, the structural wire-frame being constituted by a plurality of line units that are connected by nodes and present in a form of line segments;
generate, at each non-manifold node of non-manifold nodes of the structural wire-frame, a polyhedral structure formed by faces of a polyhedron, edges of the polyhedral structure forming a plurality of quadrilateral connecting wire-frames, wherein each line unit of the line units corresponds to the polyhedral structure running through one connecting wire-frame of the plurality of quadrilateral connecting wire-frames;
generate, at each manifold node of manifold nodes of the structural wire-frame, a square connecting face with the manifold node as a center point;
generate, at each end node of end nodes of the structural wire-frame, a square end face with the end node as a center point;
connect, for a line unit with one end being a non-manifold node and the other end being a manifold node, in one-to-one correspondence, vertices of the connecting wire-frame to vertices of the connecting face traveled by the line unit and forming a tube;
connect, for a line unit with both ends being manifold nodes, in one-to-one correspondence, vertices of two of the connecting faces and forming a tube;
connect, for a line unit with one end being a non-manifold node and the other end being an end node, in one-to-one correspondence, vertices of the connecting wire-frame to vertices of the end face traveled by the line unit and forming a tube;
connect, for a line unit with one end being a manifold node and the other end being an end node, in one-to-one correspondence, vertices of the connecting face to vertices of the end face and forming a tube;
connect, for a line unit with both ends being non-manifold nodes, in one-to-one correspondence, vertices of the connecting wire-frame traveled by two of the line units and forming a tube; and
carry out a curved-surface subdivision.

18. A modeling system for a tubular structure, comprising a processor and a memory storing a computer program, wherein the processor, when running the computer program, is caused to:
acquire a structural wire-frame, the structural wire-frame being constituted by a plurality of line units that are connected by nodes and present in a form of line segments;
generate, at each non-manifold node of non-manifold nodes of the structural wire-frame, a polyhedral structure formed by faces of a polyhedron, edges of the polyhedral structure forming a plurality of quadrilateral connecting wire-frames, each line unit of the line units corresponding to the polyhedral structure running through one connecting wire-frame of the plurality of quadrilateral connecting wire-frames;
generate, at each manifold node of manifold nodes of the structural wire-frame, a square connecting face with the manifold node as a center point;
generate, at each end node of end nodes of the structural wire-frame, a square end face with the end node as a center point;
connect, for a line unit with one end being a non-manifold node and the other end being a manifold node, in one-to-one correspondence, vertices of the connecting wire-frame to vertices of the connecting face traveled by the line unit and forming a tube;
connect, for a line unit with both ends being manifold nodes, in one-to-one correspondence, vertices of two of the connecting faces and forming a tube;
connect, for a line unit with one end being a non-manifold node and the other end being an end node, in one-to-one correspondence, vertices of the connecting wire-frame to vertices of the end face traveled by the line unit and forming a tube;
connect, for a line unit with one end being a manifold node and the other end being an end node, in one-to-one correspondence, vertices of the connecting face to vertices of the end face and forming a tube;
connect, for a line unit with both ends being non-manifold nodes, in one-to-one correspondence, vertices of the connecting wire-frame traveled by two of the line units and forming a tube; and
carry out a curved-surface subdivision.

* * * * *